A. L. CALVERT.
HIGH PRESSURE VALVE.
APPLICATION FILED DEC. 17, 1917.

1,274,680.

Patented Aug. 6, 1918.

INVENTOR
ABRAHAM L. CALVERT.

UNITED STATES PATENT OFFICE.

ABRAHAM LINCOLN CALVERT, OF WELLAND, ONTARIO, CANADA.

HIGH-PRESSURE VALVE.

1,274,680.   Specification of Letters Patent.   Patented Aug. 6, 1918.

Application filed December 17, 1917. Serial No. 207,606.

*To all whom it may concern:*

Be it known that I, ABRAHAM LINCOLN CALVERT, of the town of Welland, in the county of Welland, in the Province of Ontario, Canada, have invented certain new and useful Improvements in High-Pressure Valves, of which the following is the specification.

My invention relates to improvements in high pressure valves and the object of the invention is to devise a valve, which will give a maximum passage area for the out flow of water, which will effect a minimum amount of friction to such passage and in which all shoulders are eliminated against which water could pack, in which the discharged water is directed to automatically wash off the valve seat and keep it clear of foreign matter, in which the detriment due to the formation of wedges, shoulders or burs hampering the action of the valve is eliminated, in which a supplemental seating means is provided for preventing leakage of the valve should the metal surface of the valve not seat tight and in which the danger of the valve breaking off immediately below its seating surface is eliminated and it consists essentially of the following arrangement and construction of parts as hereinafter more particularly explained.

In the drawings like characters of reference indicate corresponding parts in the various figures.

Figure 1:
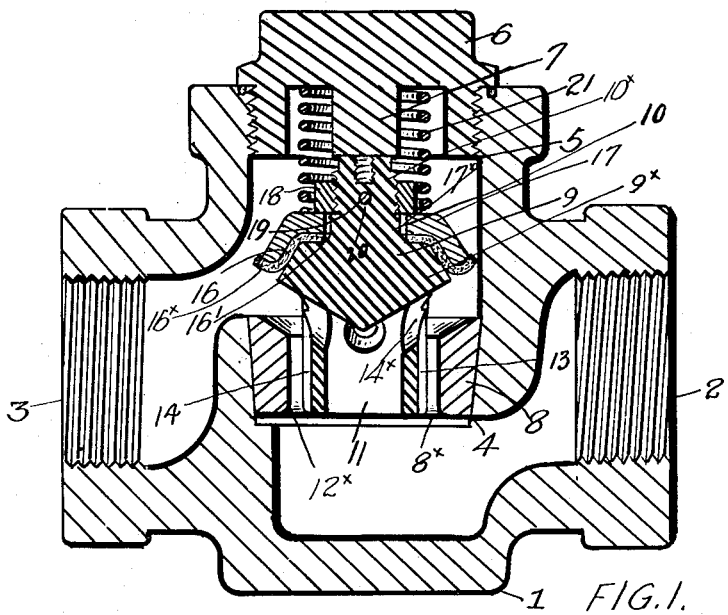
Figure 1, is a sectional view of my valve and casing as constructed to form a check valve.

1 indicates a casing, which is provided with an inlet orifice 2 and outlet orifice 3 and horizontally disposed valve seat receiving recess 4 located intermediately between the inlet and outlet of the casing. The interior face of the wall of the recess 4 is tapered. The casing 1 is also provided with an orifice 5 vertically above the recess 4 for the insertion of the valve, such orifice being internally threaded and provided with a closing cap 6 which is provided with a central depending stem 7.

8 indicates the valve seat, the exterior face of which is tapered, the valve seat being driven into the recess 4 to form a tight fit. The valve seat is preferably made of phosphorus bronze and is formed with a central orifice $8^x$ through which the lower portion of the valve as hereinafter described extends. The top of the valve seat at the upper end of the hole $8^x$ is countersunk at an angle of 60° to its axis, the outer edge of the countersinking ending at a short distance away from the exterior circumference of the valve seat. The bottom edge of the hole $8^x$ is rounded off at a slight radius for a purpose which will hereinafter appear.

9 indicates a valve. $9^x$ indicates the body of the valve, the lower portion of which tapers at an angle of 60° to the axis to the point of its greatest circumference. The upper portion of the valve body recedes at an angle of 30° to the axis, the upper face of the valve body being flat. The intersection between the upper inwardly inclined portion and the flattened top is slightly rounded for a purpose which will hereinafter appear.

10 indicates a stem extending upwardly from the center of the flattened upper end of the valve body 9 and is provided with an intermediate threaded portion $10^x$. The extreme upper end of the stem is reduced to a diameter equal to the diameter of the root of the threaded portion $10^x$ forming the stem end which normally abuts against the lower end of the depending portion 7 of the cap 6 when the valve is in the open position.

Figure 2:
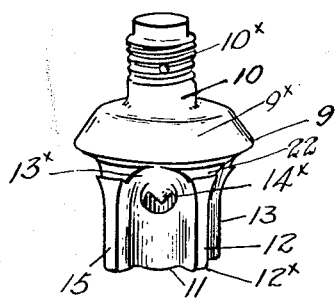
Fig. 2, is a perspective detail of my valve.
Figure 3:
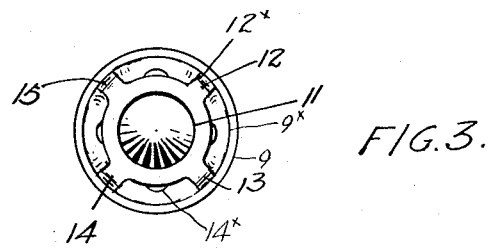
Fig. 3, is an inverted plan view of the valve shown in Fig. 2.

The lower part of the valve consists of a cylindrical portion 11 from which extend four wings 12, 13, 14 and 15, the exterior of which extends freely through the central orifice $8^x$ of the valve seat 8. The bottom outer edge of these wings is slightly rounded at $12^x$ for a purpose which will hereinafter appear. The tops of the wings 12, 13, 14 and 15 in proximity to the body 9 are widened out toward each other in such a manner as to form a semi-circular end $13^x$ (see Fig. 2), the edge of this rounded portion and the sides of the wings gradually merging by means of a filleted portion into the exterior surface of the cylindrical portion 11. All the sharp edges of the wings are rounded off so as to leave no chance of their cutting the valve seat.

22 indicates an undercut portion formed in the enlarged upper ends of the wings. By forming this undercut portion a clearance is formed for any bur which may be formed on the inner edge of the valve seat.

At the extreme upper end of the semi-circular portion or flute and between the wings are formed holes 14$^x$ drilled at an angle of 60° to the axis of the cylinder, a hole 14$^x$ being located between each pair of wings. The hole forming the center of the cylinder ends at its intersection with the upper edge of these four holes, which edge is coincident with the semi-circular end of the flutes at the point of extreme circumference over the wings. The sloping portion of the valve of 60° as hereinabove referred to blends in with the upper edge of the four holes 14$^x$ to form a continuation of such edges.

16 indicates a washer formed of leather and is shaped like an inverted saucer with a curled lip outer edge portion 16$^x$ and with a central hole 16' slightly larger than the diameter of the threaded portion 10$^x$ of the valve stem.

17 indicates a guard, which is also preferably made of phosphorus bronze, the lower face of which is inverted saucer shaped so as to conform to the shape of the washer 16 over which it fits, the guard being provided with a central orifice 17$^x$ through which the stem 10 of the valve extends. It will be noticed that all the interior corners of the recess portion of the guard are rounded so as to provide a minimum amount of wear upon the washer.

18 indicates a nut which is screwed upon the portion 10$^x$ of the stem 10 against the guard 17 and is permanently secured in position by a cotter pin 19 extending through a diametric orifice 20 formed in the threaded portion 10$^x$ of the stem 10. The nut 18 is also made of phosphorus bronze.

21 indicates a spring of phosphorus bronze which extends between the guard 17 and the lower face of the cap 6 and is of such diameter as to extend freely around the nut 18. The spring is of spiral form, the ends being in the form of a flat coil so as to bear snugly against the face of the guard 17 and cap 6.

It will thus be seen that when sufficient pressure is brought against the lower face of the valve 9 it is raised against the pressure of the spring 21 until the upper end of the stem 10$^x$ engages the depending portion 7 of the cap 6 assuming the position shown in Fig. 1 of the drawings. When in this position the water flow passes up both through the center of the cylindrical portion 11 and through the space formed between the wings 12, 13, 14 and 15 exterior to the cylinder and between the cylinder and the interior face of the valve seat. The water flow passing upwardly through the center of the cylindrical portion passes outwardly in an inclined direction through the orifices 14, the flow of the water being directed so that as it passes over the upper end of the valve seat it washes off such upper end and keeping it clear of any foreign matter. If, however, any foreign matter should stick between the valve seat and the valve when it assumes its closed position the outer curled end of the leather washer 16 will engage with the upper face of the valve seat thereby effectually sealing the joint.

It will also be seen that the upper end of the recessed portion between the wings 12, 13, 14 and 15 is concaved in such a form that no shoulder is formed with which the water pressure would engage during the reseating of the valve. By this means when the valve drops to its seated position the valve tends to cut through the water pressure opposing it enabling it to reseat itself easily. The filleted portion between the wings of the valve adds strength to the valve. The valve body is formed of a metal having a high tensile strength thereby eliminating any danger of breaking off of the valve immediately below the seat. The leather washer being under pressure readily adjusts itself to the contour of the valve body and is also practically indestructible seeing that only a small portion of its surface is exposed to the water. The rounded lower ends of the valve wings and the rounded lower edge of the valve seat prevents the cutting of the valve seat at the time of the insertion of the valve and also prevents shoulders or wedges being built up at the lower end edge of the valve wing during the operation of the valve which would then wear the opposing wall of the valve seat orifice 8$^x$.

It will also be noticed that when the valve seats itself that the leather washer 16 is forced into contact with the valve seat by the water pressure before the metal parts of the valve come into contact with the seat, thereby producing a cushioning effect reducing the force of the blow of the metal parts coming into contact and thereby eliminating the jar, which would otherwise take place and which is liable to crack off the lower part of the valve.

Although I have described my valve as a high pressure valve it will, of course, be understood that it might be adapted for use where low pressures are employed and also although I have described my valve as a check valve it might be readily adapted for use as a suction or discharge valve such as are used in pumps.

The upper end of the valve stem may be provided with an internally threaded orifice 30. By this means a long eye rod having a threaded lower end may be inserted and screwed into the orifice 30 so that the valve may be lowered into place or lifted out of place when it is desirable to remove the valve for the purpose of repair and such eye rod when screwed into position in the recess may be also used for turning the valve to grind the face thereof to fit the seat.

From this description it will be seen that I have devised a very simple form of high pressure valve which will be strong and durable, which will have a maximum passage area for the outflow of water, which will eliminate all abrupt shoulders against which water would pack, which will so direct the discharged water as to clean off the valve seat and is so constructed that all wedges, shoulders or burs formed by the operation of the valve will not detrimentally effect the valve and in which supplemental means is provided whereby any danger of leakage through the valve not seating itself tight will be obviated.

What I claim as my invention is—

1. In a high pressure valve, the combination with the valve casing having a valve seat, of a valve body formed with a central outflow duct and exterior outflow ducts extending upwardly from the bottom thereof.

2. In a high pressure valve, the combination with the valve casing having a valve seat, of a valve comprising a body portion, a cylindrical portion depending from such body portion having outlet orifices at its upper end next to the valve body and recessed portions formed at the exterior of the cylindrical portion so as to form interior and exterior outflow ducts.

3. In a high pressure valve, the combination with the valve casing having a valve seat having its upper edge inclined, of a valve comprising a valve body having its lower end tapered to conform to the incline of the upper end of the valve seat, a cylindrical portion depending from such tapered portion having orifices at its upper end inclined to conform with the taper of the lower end of the valve body.

4. In a high pressure valve, the combination with the valve casing having a valve seat having its upper edge inclined, of a valve comprising a valve body having its lower end tapered to conform to the incline of the upper end of the valve seat, a cylindrical portion depending from such tapered portion having orifices at its upper end inclined to conform with the taper of the lower end of the valve body, and wing members extending radially outwardly from the exterior of the cylindrical portion so as to pass freely through the valve seat.

5. In a high pressure valve, the combination with the valve casing having a valve seat having its upper edge inclined, of a valve comprising a spring held valve body having its lower end tapered to conform to the incline of the upper end of the valve seat, a cylindrical portion depending from such tapered portion having orifices at its upper end inclined to conform with the taper of the lower end of the valve body, and wing members extending radially outwardly from the exterior of the cylindrical portion so as to pass freely through the valve seat and forming recesses having semi-circular upper ends concaved to merge into the exterior face of the valve and form outflow ducts.

6. In a valve, the combination with the valve casing and valve seat, of a valve comprising a valve body having a depending portion forming guiding means extending through the valve seat and having outflow ducts extending therethrough, an inwardly tapered portion forming the upper portion of the valve body, an inverted saucer-shaped washer fitting over the upper tapered portion and having out curled edges, and supporting means carried by the valve against which the washer bears when carried to its seated position.

7. In a valve, the combination with the valve casing and valve seat, of a valve comprising a valve body having a depending portion forming guiding means extending through the valve seat and having outflow ducts extending therethrough, an inwardly tapered portion forming the upper portion of the valve body, an inverted saucer-shaped washer fitting over the upper tapered portion and having out curled edges, and a guard member secured to the valve and having a saucer-shaped recessed lower face conforming to the shape of the flexible washer and against which such washer bears when carried to the seated position.

8. In a valve, the combination with the valve body, of a depending cylindrical extension having outlet orifices at its upper end adjacent to the valve body, wings extending radially from the depending cylindrical portion.

9. In a valve, the combination with the valve body having a tapered lower portion, of a depending cylindrical portion depending from such valve body and having orifices at its upper end set at an incline to correspond to the incline of the tapered lower end of the valve body.

10. In a valve, the combination with the valve body having a tapered lower portion, of a depending cylindrical portion depending from such valve body and having orifices at its upper end set at an incline to correspond to the incline of the tapered lower end of the valve body, and wings extending radially from the depending portion.

11. In a valve, the combination with the valve body having a tapered lower portion, of a depending cylindrical portion depending from such valve body and having orifices at its upper end set at an incline to correspond to the incline of the tapered lower end of the valve body, and wings extending radially from the depending portion, having their upper ends formed semi-circular and concaved to merge gradually into the inclined face of the valve body.

12. In a valve, the combination with the valve body, of a depending portion extending from the lower end of the valve body having radial wings extending therefrom, and an undercut portion extending around the body at the point of junction between the wings.

ABRAHAM LINCOLN CALVERT.

Witnesses:
M. EGAN,
R. MOFFET.